United States Patent
Marriott et al.

(10) Patent No.: US 10,234,576 B2
(45) Date of Patent: Mar. 19, 2019

(54) METHOD AND SYSTEM FOR CALIBRATING GAMMA RADIATION FLUX LEVELS IN A SOLID STATE GAMMA RADIATION DETECTION SYSTEM

(71) Applicant: VPI Engineering, Inc., Draper, UT (US)

(72) Inventors: Kevin Marriott, Herriman, UT (US); Paul Hepworth, South Jordan, UT (US); Jeremy Williams, South Jordan, UT (US)

(73) Assignee: VPI Engineering, Inc., Draper, UT (US)

( * ) Notice: Subject to any disclaimer, the term of this patent is extended or adjusted under 35 U.S.C. 154(b) by 121 days.

(21) Appl. No.: 15/143,205

(22) Filed: Apr. 29, 2016

(65) Prior Publication Data

US 2016/0320501 A1 Nov. 3, 2016

Related U.S. Application Data (60) Provisional application No. 62/155,465, filed on Apr. 30, 2015, provisional application No. 62/192,935, filed on Jul. 15, 2015.

(51) Int. Cl.
*G01T 1/40* (2006.01)
*G01T 7/00* (2006.01)

(52) U.S. Cl.
CPC .............. *G01T 7/005* (2013.01); *G01T 1/40* (2013.01)

(58) Field of Classification Search
CPC .................................................. G01T 7/005
See application file for complete search history.

(56) References Cited

U.S. PATENT DOCUMENTS

| | | | | |
|---|---|---|---|---|
| 3,646,347 A | * | 2/1972 | Farmer | G01T 1/02 |
| | | | | 250/336.1 |
| 6,362,472 B1 | * | 3/2002 | Yarnall | G01T 1/161 |
| | | | | 250/252.1 |
| 7,005,646 B1 | * | 2/2006 | Jordanov | G01T 1/208 |
| | | | | 250/207 |

(Continued)

FOREIGN PATENT DOCUMENTS

| | | |
|---|---|---|
| EP | 2146225 | 1/2010 |
| WO | 2004061479 | 7/2004 |
| WO | 2012138236 | 10/2012 |

OTHER PUBLICATIONS

International Search Report and Written Opinion of International Patent Application No. PCT/US16/30295, dated Oct. 26, 2016, 10 pages.

(Continued)

*Primary Examiner* — David P Porta
*Assistant Examiner* — Jeremy S Valentiner
(74) *Attorney, Agent, or Firm* — Ray Quinney & Nebeker (57) ABSTRACT

One aspect of the present disclosure comprises a method for calibrating a drive level of a non-radioactive calibration source. Another aspect of the present disclosure comprises a method for using a non-radioactive calibration source to verify correct operation of a radiation detector. Another aspect of the present disclosure comprises a radiation detection system that comprises a radiation detector and a non-radioactive calibration source that is used to verify correct operation of the radiation detector.

20 Claims, 6 Drawing Sheets

(56) References Cited

U.S. PATENT DOCUMENTS

| | | | |
|---|---|---|---|
| 7,257,505 B1* | 8/2007 | Kurylak | H03H 11/1291 |
| | | | 702/107 |
| 2004/0188624 A1* | 9/2004 | Wong | G01T 1/1642 |
| | | | 250/363.09 |
| 2009/0127449 A1 | 5/2009 | Iwatschenko-Borho | |
| 2010/0100275 A1* | 4/2010 | Mian | G01M 17/013 |
| | | | 701/31.4 |
| 2011/0036988 A1* | 2/2011 | Campbell | G01T 1/026 |
| | | | 250/370.07 |
| 2012/0200421 A1* | 8/2012 | Duraj | G01T 7/005 |
| | | | 340/853.2 |
| 2013/0315780 A1 | 11/2013 | Cook et al. | |
| 2013/0324844 A1* | 12/2013 | Knowland | A61B 6/4258 |
| | | | 600/431 |
| 2014/0246591 A1* | 9/2014 | Krouse | G01J 3/10 |
| | | | 250/339.08 |

OTHER PUBLICATIONS

Extended European Search Report in European Patent Application No. 16787283.7, dated Nov. 28, 2018; 10 pages.

\* cited by examiner

METHOD AND SYSTEM FOR CALIBRATING GAMMA RADIATION FLUX LEVELS IN A SOLID STATE GAMMA RADIATION DETECTION SYSTEM

CLAIM OF PRIORITY

This application claims priority to U.S. Provisional Patent Application No. 62/155,465, titled "METHOD AND SYSTEM FOR CALIBRATING GAMMA RADIATION FLUX LEVELS IN A SOLID STATE GAMMA RADIATION DETECTION SYSTEM," filed Apr. 30, 2015, with inventors Kevin Marriott, Paul Hepworth, and Jeremy Williams, which is incorporated herein by reference as if fully set forth.

This application also claims priority to U.S. Provisional Patent Application No. 62/192,935, titled "METHOD AND SYSTEM FOR CALIBRATING GAMMA RADIATION FLUX LEVELS IN A SOLID STATE GAMMA RADIATION DETECTION SYSTEM," filed Jul. 15, 2015, with inventors Kevin Marriott, Paul Hepworth, and Jeremy Williams, which is incorporated herein by reference as if fully set forth.

GOVERNMENT LICENSE RIGHTS

This invention was made with Government support under subcontract 241560 to Battelle Memorial Institute under Battelle's prime contract DE-AC05-76RL01830, awarded by the United States Department of Energy. The Government has certain rights in the invention.

TECHNICAL FIELD

The present disclosure relates generally to a method and system for calibrating gamma radiation flux levels in a solid state gamma radiation detection system and verifying proper operation of the gamma radiation detection system.

BACKGROUND

Gamma-ray detection systems have been used in a variety of applications. For example, gamma radiation detection systems have been used to identify and monitor gamma-ray sources in scientific, industrial, and environmental monitoring applications.

Radiation detection systems are typically calibrated against a radioisotope which has a known energy level. This may be accomplished by calibrating each radiation detection system periodically in a lab. For example, a probe may be held near a radioisotope having a known, characteristic gamma radiation energy level. Each gamma-ray photon emitted by the radioisotope represents a singular radioactive event and each gamma-ray photon has an energy level measurable in kilo electron volts (keV). Each such gamma-ray photon or radioactive event which is detected by a probe may be referred to as a count.

Normally, probes are designed and manufactured to have a predetermined output signal level for a count of a predetermined energy level. However, a probe can lose calibration between the time it is calibrated in a lab and the time it is actually used. Calibration loss can also occur due to mishandling of the probe or during a prolonged period of storage. A probe's response may also be affected by temperature and other environmental factors. In addition, the radioisotopes typically used in a calibration lab are not always the same as those used in actual applications. Therefore, it is necessary to provide a method for calibrating the radiation detection system and verifying proper operation of the radiation detection system.

SUMMARY

One aspect of the present disclosure comprises a method for calibrating a drive level of a non-radioactive calibration source. In accordance with the method, a response of a radiation detector to background radiation may be measured. A response of the radiation detector to the background radiation plus a radiation reference may also be measured. A response of the radiation detector to the background radiation plus the non-radioactive calibration source may also be measured. The drive level of the non-radioactive calibration source may be adjusted until the response of the radiation detector to the background radiation plus the non-radioactive calibration source substantially matches the response of the radiation detector to the background radiation plus the radiation reference.

The non-radioactive calibration source may comprise a light-emitting diode (LED).

When the response of the radiation detector to the background radiation is measured, the radiation reference may not be within range of the radiation detector and the non-radioactive calibration source may be off. When the response of the radiation detector to the background radiation plus the radiation reference is measured, the non-radioactive calibration source may be off. When the response of the radiation detector to the background radiation plus the non-radioactive calibration source is measured, the radiation reference may not be within range of the radiation detector.

The method may additionally comprise storing verification data. The verification data may comprise the drive level of the non-radioactive calibration source that caused the response of the radiation detector to the background radiation plus the non-radioactive calibration source to substantially match the response of the radiation detector to the background radiation plus the radiation reference.

The verification data may additionally comprise at least one of: the response of the radiation detector to the background radiation; the response of the radiation detector to the background radiation plus the non-radioactive calibration source; a difference between the response of the radiation detector to the background radiation plus the non-radioactive calibration source and the response of the radiation detector to the background radiation; a known dose rate of the radiation reference; and a temperature of at least one of the radiation detector and the non-radioactive calibration source when the response of the radiation detector to the background radiation plus the non-radioactive calibration source is measured.

The method may additionally comprise: measuring at least one temperature corresponding to at least one of the radiation detector and the non-radioactive calibration source when the response of the radiation detector to the background radiation is measured; measuring at least one temperature corresponding to at least one of the radiation detector and the non-radioactive calibration source when the response of the radiation detector to the background radiation plus the radiation reference is measured; and measuring at least one temperature corresponding to at least one of the radiation detector and the non-radioactive calibration source when the response of the radiation detector to the background radiation plus the non-radioactive calibration source is measured.

Calibration may be restarted if the at least one temperature that is measured when the response of the radiation detector to the background radiation plus the non-radioactive calibration source is measured does not substantially match: the at least one temperature that is measured when the response of the radiation detector to the background radiation is measured; and the at least one temperature that is measured when the response of the radiation detector to the background radiation plus the radiation reference is measured.

The steps of measuring the response of the radiation detector to the background radiation plus the radiation reference, measuring the response of the radiator detector to the background radiation plus the non-radioactive calibration source, and adjusting the drive level of the non-radioactive calibration source may be repeated for at least one additional radiation reference.

The method may additionally comprise configuring a thermoelectric cooling system to maintain a new temperature for the radiation detector and the non-radioactive calibration source. The steps of measuring the response of the radiation detector to the background radiation, measuring the response of the radiation detector to the background radiation plus the radiation reference, measuring the response of the radiator detector to the background radiation plus the non-radioactive calibration source, and adjusting the drive level of the non-radioactive calibration source may be repeated while the new temperature is maintained.

The radiation detector may comprise an array of detector elements. Each detector element may be optimized for a specific range of radiation dose rates. The method described above may be performed for each detector element of the array of detector elements. In addition, the method may be performed for one detector element at a time.

Another aspect of the present disclosure comprises a method for verifying correct operation of a radiation detector. In accordance with the method, a response of the radiation detector to background radiation may be measured. The method may also include driving a non-radioactive calibration source to a drive level that is specified in verification data. The verification data may be determined during calibration of the non-radioactive calibration source. A response of the radiation detector to the background radiation plus the non-radioactive calibration source may also be measured. The method may also include determining whether the radiation detector is operating correctly based on the verification data and the response of the radiation detector to the background radiation plus the non-radioactive calibration source.

It may be determined that the radiation detector is operating correctly if a difference between the response of the radiation detector to the background radiation plus the non-radioactive calibration source and the response of the radiation detector to the background radiation substantially matches a corresponding value in the verification data.

It may be determined that the radiation detector is not operating correctly if a difference between the response of the radiation detector to the background radiation plus the non-radioactive calibration source and the response of the radiation detector to the background radiation does not substantially match a corresponding value in the verification data.

The non-radioactive calibration source may be off when the response of the radiation detector to the background radiation is measured. In addition, the method may be performed without any radiation sources other than the background radiation within range of the radiation detector.

The method may additionally comprise measuring at least one temperature corresponding to at least one of the radiation detector and the non-radioactive calibration source when the response of the radiation detector to the background radiation is measured; and measuring at least one temperature corresponding to at least one of the radiation detector and the non-radioactive calibration source when the response of the radiation detector to the background radiation plus the non-radioactive calibration source is measured.

The verification data may comprise data corresponding to a plurality of different radiation references. In such a case, the method may comprise identifying a subset of the verification data corresponding to a radiation reference dose rate that is closest to a dose rate of interest; and using the subset of the verification data to determine whether the radiation detector is operating correctly.

The verification data may comprise data corresponding to a plurality of different temperature points. In such a case, the method may comprise identifying a subset of the verification data corresponding to a temperature point that is closest to a current measured temperature; and using the subset of the verification data to determine whether the radiation detector is operating correctly.

Another aspect of the present disclosure comprises a radiation detection system. The radiation detection system may comprise a radiation detector and a non-radioactive calibration source. The non-radioactive calibration source may be used to verify correct operation of the radiation detector. The radiation detector and the non-radioactive calibration source may be positioned such that photons emitted from the non-radioactive calibration source are detected by the radiation detector. The radiation detection system may also comprise a light shield that shields the radiation detector and the non-radioactive calibration source from outside light sources.

The radiation detection system may additionally comprise a thermoelectric cooling system that controls a temperature of the radiation detector.

The radiation detection system may additionally comprise a thermoelectric cooling system that controls a temperature of the non-radioactive calibration source.

The radiation detection system may comprise a printed circuit board (PCB). The radiation detector and the non-radioactive calibration source may be mounted to the PCB. The light shield may be attached to the PCB such that the light shield covers the radiation detector and the non-radioactive calibration source, and a light-tight seal exists between the light shield and the PCB.

DETAILED DESCRIPTION

The present disclosure provides a method and system for calibrating gamma radiation flux levels in a solid state gamma radiation detection system and verifying proper operation of the radiation detection system. The method and system employ an LED or any non-radioactive photon source (which will be referred to as a "non-radioactive calibration source" hereafter) to simulate gamma radiation flux levels.

Figure 1:
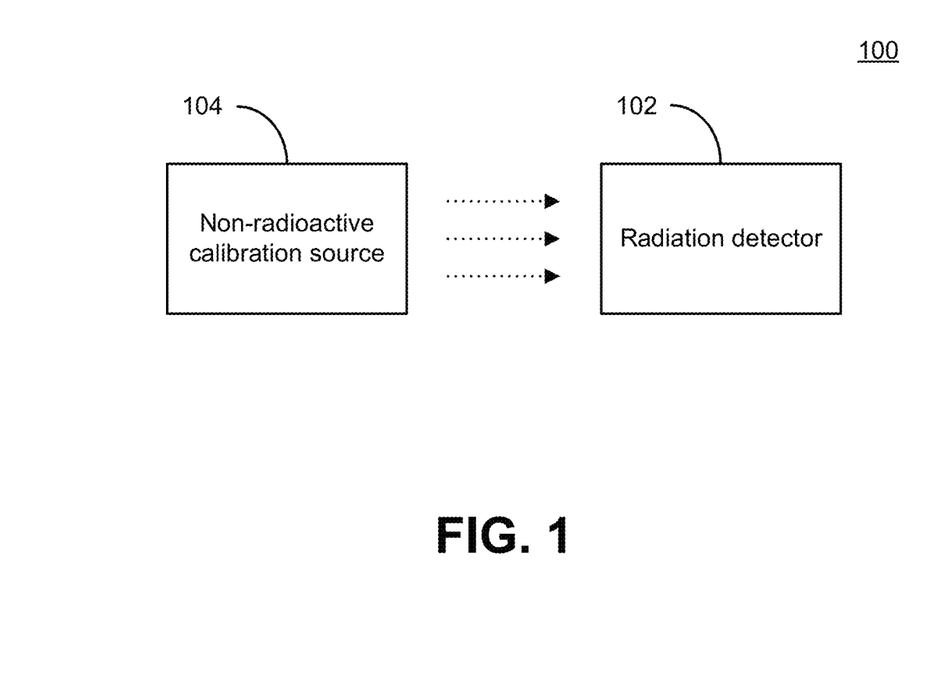
FIG. 1 depicts an example of a system for calibrating gamma radiation flux levels in a solid state gamma radiation detection system in accordance with an exemplary embodiment of the present disclosure.

FIG. 1 depicts an example of a system 100 for calibrating gamma radiation flux levels in a solid state gamma radiation detection system in accordance with an exemplary embodiment of the present disclosure. The system 100 includes a radiation detector 102 and at least one non-radioactive calibration source 104.

The radiation detector 102 measures the energy of radioactive particles and provides an output signal having an amplitude proportional to the energy of the detected particles. One of the requirements of the radiation detection system 100 is that the output of the radiation detector 102 should accurately represent the energy level of incident radiation.

The radiation detector 102 is typically calibrated against a radioactive source which has a known energy level. The calibration of the radiation detector 102 may be performed periodically or as needed in a lab using a radioactive source having a known, characteristic gamma radiation energy level. However, this is a cumbersome process since the radioactive source is difficult to obtain, costly, and hazardous.

In accordance with one embodiment, a non-radioactive calibration source 104 (e.g., an LED) is used to calibrate, or verify proper functioning of, the radiation detector 102. At the time of calibration of the radiation detector 102 with an actual gamma radiation source, the drive strength of the non-radioactive calibration source 104 (which will be referred to as "calibration drive strength" hereafter) is adjusted to yield an output signal (which will be referred to as a "calibration output signal" hereafter) from the radiation detector 102 that is equivalent to the signal output seen with the actual gamma radiation source. In accordance with another embodiment, additional LEDs may be calibrated with reference to a previously calibrated LED (secondary standard) rather than with reference to a primary radiation source (primary standard). The secondary standard may be driven to its calibrated level that matches the primary standard, and the drive strength of the new LED being calibrated may be adjusted to match the output of the secondary standard. The LED being calibrated and the secondary standard may be compared under the same temperature (and background) conditions.

During normal operation of the radiation detector 102, the non-radioactive calibration source 104 may be used to confirm proper functioning of the radiation detector 102. For verifying the proper operation of the radiation detector 102 periodically or as needed, the non-radioactive calibration source 104 may be driven to the predetermined calibration drive strength, and the output signal from the radiation detector 102 in response to the radiation from the non-radioactive calibration source 104 is monitored. If the output signal from the radiation detector 102 is equivalent to the calibration output signal that is equivalent to the signal output seen with the actual gamma radiation source, it may confirm proper functioning of the radiation detector 102.

This method for calibrating gamma radiation flux levels on a solid state gamma radiation detection system may eliminate or reduce the need to use radioactive test sources, which are often difficult to obtain, costly, and hazardous.

The verification using the non-radioactive calibration source may be performed periodically or may be performed as needed. The non-radioactive calibration source 104 may be built into the radiation detection system 100 such that the verification may be performed automatically (e.g., periodically). Alternatively, the verification may be performed manually.

Background radiation level is of concern with respect to verification or calibration of the radiation detector 102. The field verification or calibration is suitable for use in environments in which the background radiation level is known. For example, if the background radiation level has changed and the radiation detector is operating correctly, the check would not match the expected absolute output. The measured value would be the result of the background radiation plus the check standard.

In accordance with one embodiment, in order to perform field verification or calibration in environments in which the background radiation level is unknown, a relative check may be performed. First, for the relative check, the radiation detector output due to the background radiation is measured without turning on the non-radioactive calibration source 104 (e.g., an LED). The non-radioactive calibration source 104 is then turned on, and the change in output of the radiation detector 102 due to activating the non-radioactive calibration source 104 is observed. The measured relative value may be used for the purpose of verification. For example, if the expected reading of the radiation detector 102 with an LED on with zero background radiation is 100 and the background radiation reads as 20, the proper operation of the radiation detector 102 may be verified if the output of the radiation detector 102 with the LED on is 120.

The calibration curve may be applied to both the background and the background+LED readings. Alternatively, the raw output of the background and background+LED readings may be considered. In other words, the values may be checked by looking at the output at the background and at the background+LED readings with the current calibrations applied to both readings. Alternatively, the raw counts may be checked (i.e., without the calibration factors applied) and the verification may be performed based on the expected relative raw value.

In accordance with another embodiment, the non-radioactive calibration source 104 (e.g., an LED) may be initially set up to provide more than one reference level, and the verification may be performed at the level closest to the level of interest (e.g., closest to the alarm threshold level).

Alternatively, multiple reference levels may be used to check the calibration curve. For example, two levels may be used in order to check the calibration slope and offset (for a linear calibration). In another example, more than two levels may be used to check higher-order calibration polynomials. The multiple levels may be used for both calibration and verification.

In one embodiment, a single non-radioactive calibration source may be used. In another embodiment, two or more non-radioactive calibration sources may be used. For example, the system 100 may include two independent LEDs (and two independent sets of drive circuitry), each with configurable levels. The first LED may be used as a calibration LED and may be set up with, for example, three levels (i.e., three drive levels that are matched to three different levels of radioactive calibration standards during initial calibration). The second LED may be used as a verification LED and may be set up with, for example, two additional levels. A field calibration may use the three levels of the calibration LED to calibrate the radiation detector. After field calibration and during normal use (e.g., periodically), one or both levels of the verification LED may be used to check the calibration of the radiation detector.

In another embodiment, a temperature control of the non-radioactive calibration source may be performed to maintain the temperature of the non-radioactive calibration source in a tight range. The LED output for a given drive current depends on the temperature of the LED. Therefore, the temperature of the non-radioactive calibration source (e.g., an LED) may be controlled to make sure that the output of the non-radioactive calibration source is more consistent (i.e., make it a more stable reference and a better calibration and verification standard). For example, the temperature of the non-radioactive calibration source may be controlled using thermoelectric cooling. A thermoelectric heat pump or the like may be used to transfer heat from one side of the device to the other such that the temperature of the non-radioactive calibration source remains in a predetermined range. The temperature control ensures that the non-radioactive calibration source is operating at the proper temperature (e.g., the same temperature as when the drive strength of the non-radioactive calibration source was set initially).

Figure 2:
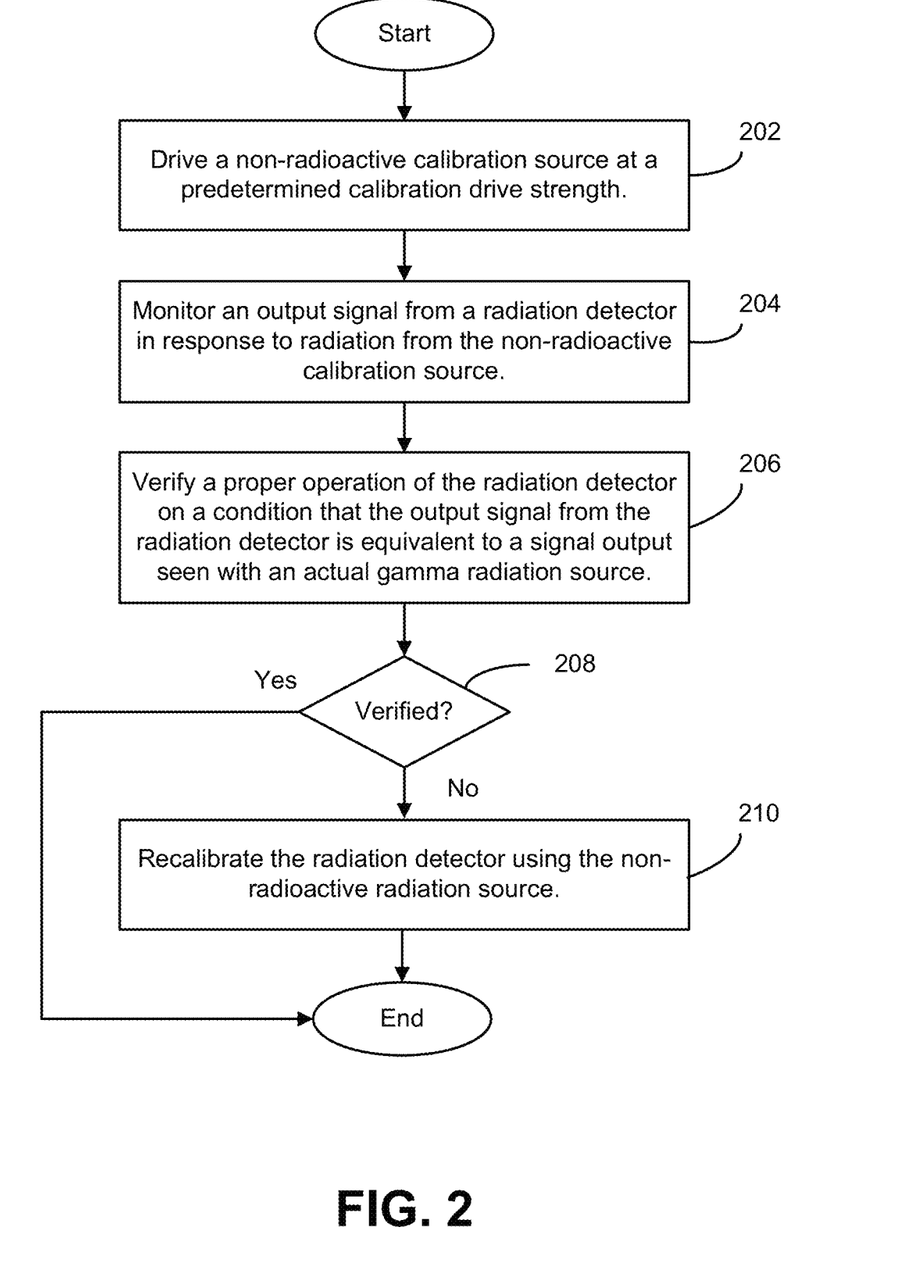
FIG. 2 is a flow diagram of an example of a process for calibrating gamma radiation flux levels in a solid state gamma radiation detection system in accordance with an exemplary embodiment of the present disclosure.

FIG. 2 is a flow diagram of an example of a process for calibrating gamma radiation flux levels in a solid state gamma radiation detection system in accordance with an exemplary embodiment of the present disclosure. A non-radioactive calibration source (e.g., an LED) is driven at a predetermined calibration drive strength in order to illuminate the radiation detector (202). The drive strength of the non-radioactive calibration source (i.e., the calibration drive strength) may be adjusted to yield a calibration output signal from the radiation detector that is equivalent to the signal output seen with the actual gamma radiation source.

An output signal from the radiation detector in response to the radiation from the non-radioactive calibration source is then monitored (204). A proper operation of the radiation detector may be verified on a condition that the output signal from the radiation detector is equivalent to a signal output seen with the actual gamma radiation source (206).

The output signal from the radiation detector can drift over time. The output signal can also vary in response to temperature. Therefore, recalibrating the radiation detector may be required to maintain accuracy. If it is determined (208) that the verification is not successful, the radiation detector may be recalibrated using the non-radioactive radiation source (e.g., an LED) (210).

As disclosed above, the verification of proper operation of the radiation detector may be performed first and the recalibration may be performed if the verification fails. Alternatively, the verification and the recalibration may be performed independently. The recalibration may be performed using a non-radioactive calibration source (e.g., an LED). In one embodiment, more than two non-radioactive calibration sources may be used (e.g., built into the system) such that one may be used for verification and the other may be used for recalibration. In this case, initially, both LEDs (one at a time) may be adjusted independently to match the radioactive standard and during subsequent use, one may be used for verification and the other may be used for recalibration when needed.

The non-radioactive photon source may be more stable than the radiation detector, making recalibration with the non-radioactive photon source advantageous in adjusting for changing conditions with the radiation detector.

The radiation detector disclosed herein may be a solid state device based on a photodiode. The photodiode is sensitive to photons and generates an electron-hole pair(s) when a photon is absorbed. As shown in FIG. 1, a non-radioactive calibration source 104 (e.g., an LED) is integrated with a radiation detector 102. The LED can be turned on to emit light photons calibrated to the radiation detector 102 to match the dose rate response of gamma photons emitted from a radioactive source. This capability allows the performance of the radiation detector 102 to be verified frequently and monitored for changes to detector sensitivity over time. When the LED is turned off, the radiation detector 102 measures the radiation dose rate normally.

The capability of verifying the detector performance using a light photon source provides many advantages. Detector verification may not require a radioactive isotope check source and detector performance at high dose rates may be verified without hazardous material-related issues. Logistical requirements of storing, transporting, and documenting radioactive check sources and maintaining Nuclear Regulatory Commission (NRC) licensing may also be eliminated. Labor needed to manually move a check source to the detector to verify the performance of the detector may also be eliminated. The verification of the detector using the built-in non-radioactive calibration source could be more accurate and precise than manually positioning a check source next to the detector. Photon emissions relative to isotope half-life do not have to be calculated.

Figure 3:
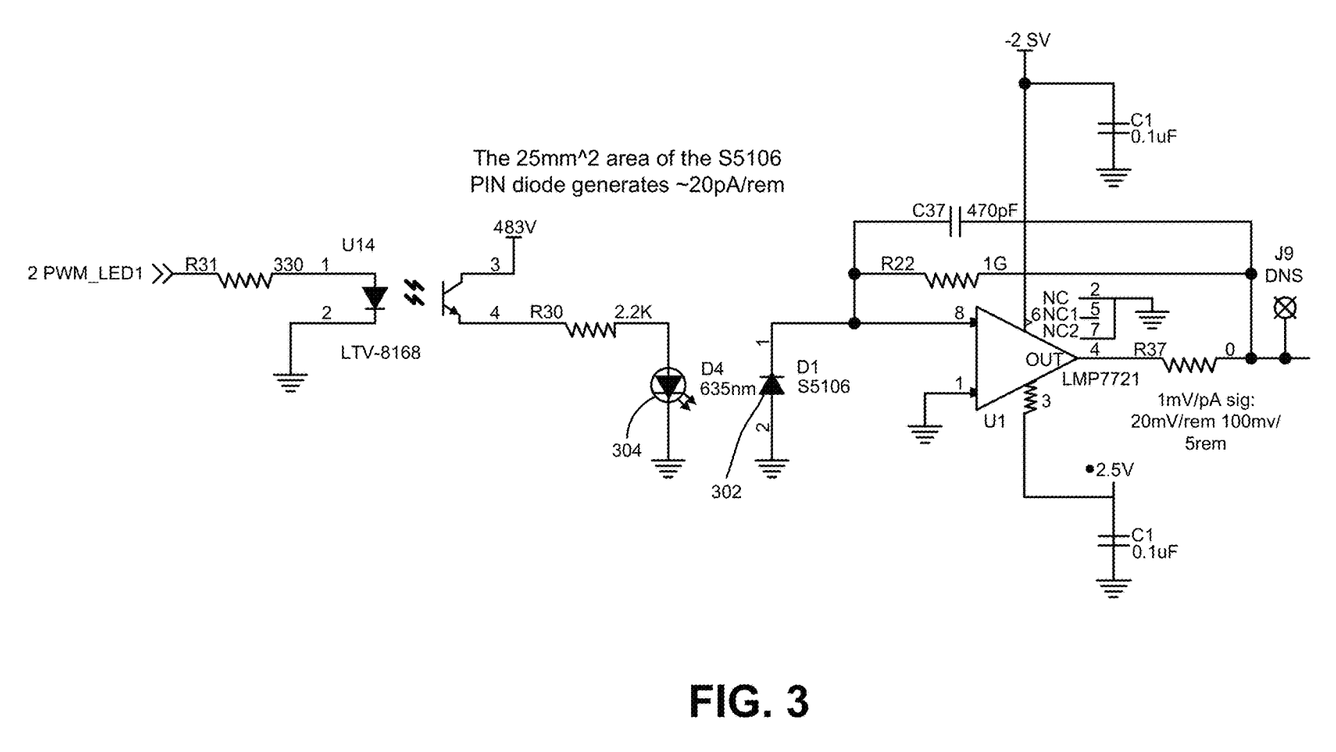
FIG. 3 is a schematic electric circuit diagram of an example of a system including a photodiode detector and a calibration LED in accordance with one embodiment.

FIG. 3 is a schematic electric circuit diagram of an example of a system including a photodiode detector 302 (i.e., a radiation detector) and a calibration LED 304 (as an example of a non-radioactive calibration source) in accordance with one embodiment. The terms "radiation detector," "photodiode detector," and "detector" are used interchangeably and are used for the combination of a photodiode detector and its associated amplifier. The calibration LED 304 and the photodiode detector 302 shown in FIG. 3 are mounted on a printed circuit board (PCB). The built-in calibration LED 304 is used for calibration and/or verification of the photodiode detector 302, as disclosed herein.

Figure 4:
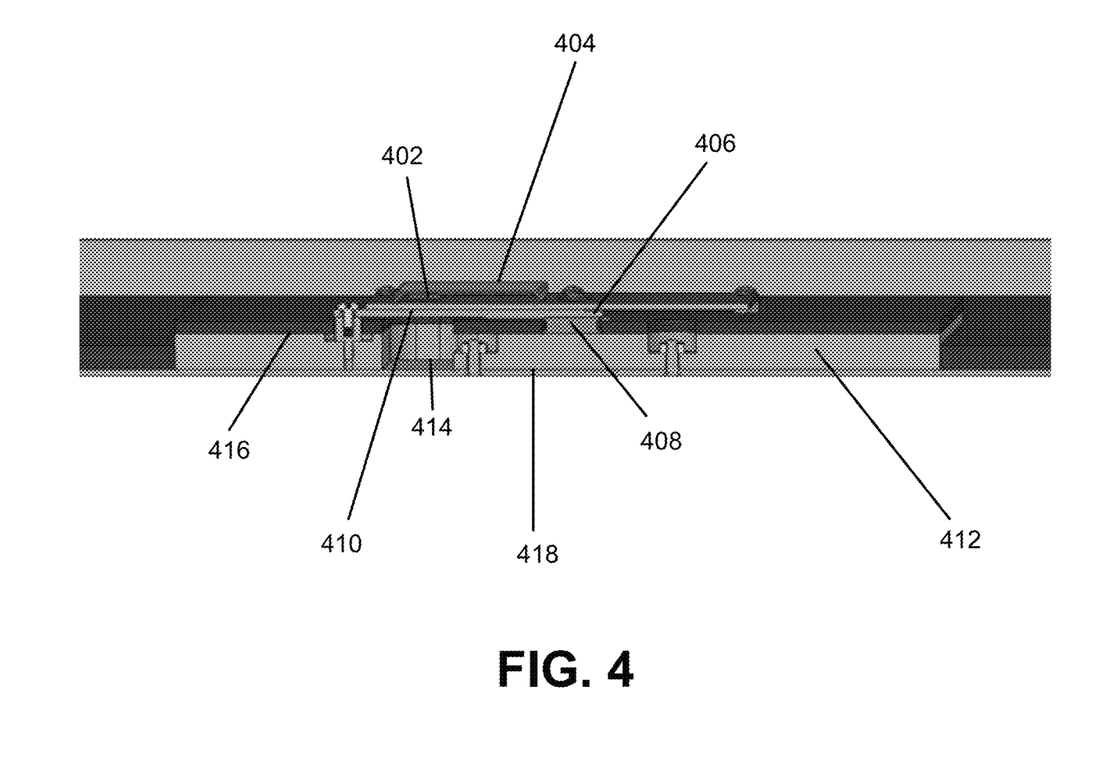
FIG. 4 shows an example of a configuration of the radiation detector and the LED on a printed circuit board (PCB) and a thermoelectric cooler installed on the PCB in accordance with an exemplary embodiment of the present disclosure.

FIG. 4 shows an example of a configuration of the radiation detector and the LED on the PCB and a thermoelectric cooler installed on the PCB in accordance with an exemplary embodiment of the present disclosure.

Both the radiation detector and the LED, which are collectively indicated by the reference number 402 in FIG. 4, may be shielded by a light shield 404 from outside light sources. The radiation detector and the LED 402 are located beneath the light shield 404. The light shield 404 may be a metal shield covering the top and sides of the radiation detector and the LED 402 mounted on the PCB 406. The light shield 404 may be attached (e.g., soldered) to the PCB 406 to create a light-tight seal. The radiation detector and the LED 402 may be mounted to an opaque PCB. The radiation detector and the LED 402 may both be mounted to the PCB 406 and situated within the light shield such that photons emitted from the LED are detected by the radiation detector. The photons from the LED may strike the radiation detector directly or after reflecting off of the light shield 404 and the PCB 406.

The radiation detector and the LED 402 may be temperature controlled for accurate photon generation and detection. The radiation detector and the LED 402 may be temperature controlled within a predetermined tight tolerance (e.g., 1° C.) of the desired operating set point, for example using thermoelectric cooling. Temperature may be measured using a thermistor adjacent to the metal shield. Temperature control may be maintained during calibration, verification, and normal operation of the radiation detector and the LED 402. Alternatively, the radiation detector (but not the LED) may be temperature controlled via thermoelectric cooling.

The temperature may be controlled to a low set point. The photodiode offset current typically increases with temperature. When the ambient temperature is not excessively high, a set point of 25° C., for example, can be maintained. When operated in a very hot ambient environment, the cooling capacity may not be sufficient to maintain such a low temperature, and one or more alternate set points may be used (e.g., 30° C.) and a corresponding alternate calibration may be used. Alternatively, the measured temperature may be used to select an alternate calibration. Calibration may be performed at multiple alternate temperature points to ensure that the reported radiation level is within the required tolerance over the full operating temperature range. During normal operation, the corresponding calibration data may be used according to the current temperature set point or current measured temperature.

Referring to FIG. 4, a thermoelectric cooler 408 may be coupled to a thermally conductive plate 410 (e.g., aluminum) located underneath the PCB 406 and to a larger heat-spreader plate 412 (e.g., aluminum), which includes a cutout 414 beneath the radiation detector and the LED 402 where the gamma radiation will pass. The thickness of the thermally conductive plate 410 may be such that only a very small percentage of gamma radiation over 100 keV is absorbed. A thermal insulation 416 is installed between the heat-spreader plate 412 and the conductive plate 410. The reference number 418 is a system enclosure wall.

Embodiments for calibrating the LED are disclosed hereafter. The LED calibration is the process of determining an LED drive level that will match the LED output to the corresponding radiation reference. The response of the radiation detector to the gamma photons is calibrated according to methods for photodiode-based radiation detectors. The drive level of the integrated LED is calibrated separately from the radiation detector, according to the embodiments described below. It may be convenient to calibrate the LED along with the radiation detector calibration using the same facility and calibration standards. Calibration is performed with the system in a natural background environment with known stable background radiation levels that are typically very low.

The term "radiation reference" is herein used to refer to a well-characterized radiation source located at a specific distance from the radiation detector to provide a known reference dose rate above the background radiation level. The same radiation source may be moved to varying distances to provide various known reference dose rates, and each would then be considered a separate "radiation reference."

Figure 5:
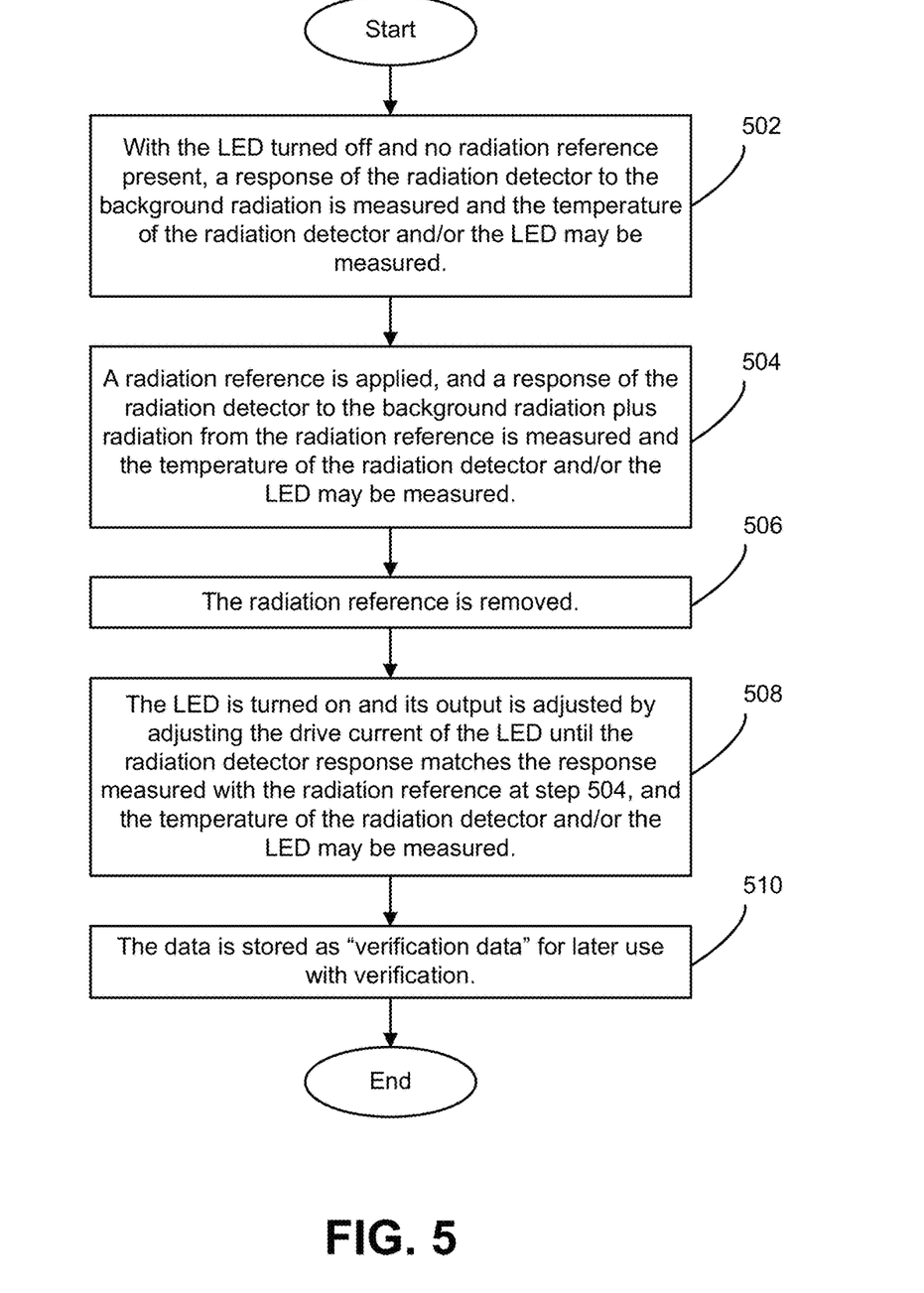
FIG. 5 is a flow diagram of an example of a process for calibrating an LED in accordance with an exemplary embodiment of the present disclosure.

FIG. 5 is a flow diagram of an example of a process for calibrating an LED (i.e., a non-radioactive calibration source) in accordance with an exemplary embodiment of the present disclosure. In step 502, with the LED turned off and no radiation reference present, a response of the radiation detector to the background radiation may be measured. The temperature of the radiation detector and/or the LED may also be measured.

In step 504, a radiation reference may be applied, and a response of the radiation detector to the background radiation plus radiation from the radiation reference may be measured. The temperature of the radiation detector and/or the LED may also be measured.

In step 506, the radiation reference may be removed. In step 508, the LED may be activated (e.g., turned on) and its output may be adjusted by adjusting the drive current of the LED until the radiation detector response substantially matches the response measured with the radiation reference at step 504. In one embodiment, the radiation detector response substantially matches the response measured with the radiation reference if the radiator detector response is the same as, or within a predetermined tolerance of, the response measured with the radiation reference. In one embodiment, the predetermined tolerance may be 0.1% of the response measured with the radiation reference. In another embodiment, the predetermined tolerance may be 0.5% of the response measured with the radiation reference. In another embodiment, the predetermined tolerance may be 1% of the response measured with the radiation reference. In another embodiment, the predetermined tolerance may be 2.5% of the response measured with the radiation reference.

The average LED drive current may be adjusted by pulse-width modulating the LED drive current. In step 508, the temperature of the radiation detector and/or LED may also be measured.

The adjusted LED drive level, the radiation detector response, and the measured temperature of the radiation detector and/or the LED may be recorded. The temperature of the radiation detector and/or the LED, as measured in step 508, is expected to substantially match the temperature values measured in steps 502 and 504.

In one embodiment, the temperature(s) measured in step 508 substantially match the temperature values measured in steps 502 and 504 if the temperature(s) measured in step 508 is/are within 0.5° C. of the temperature values measured in steps 502 and 504. In another embodiment, the temperature(s) measured in step 508 substantially match the temperature values measured in steps 502 and 504 if the temperature(s) measured in step 508 is/are within 1° C. of the temperature values measured in steps 502 and 504. In another embodiment, the temperature(s) measured in step 508 substantially match the temperature values measured in steps 502 and 504 if the temperature(s) measured in step 508 is/are within 1.5° C. of the temperature values measured in steps 502 and 504. The tolerances that are selected for a particular application may depend on the required accuracy and the actual temperature sensitivity of a given detector and/or light source (non-radioactive calibration source). In typical applications, the detector may be more sensitive to temperature than the light source. Generally speaking, a desire for greater accuracy of radiation reading may require tighter temperature tolerance. Similarly, the more sensitive to temperature the detector is, the tighter the tolerance may need to be.

If the temperature(s) measured in step 508 do not substantially match the temperature values measured in steps 502 and 504, the calibration process may be restarted.

The data may be stored as "verification data" for later use with verification (510). The verification data may include at least one of: i) the temperature of the radiation detector and/or the LED measured in step 508, ii) the LED drive level determined in step 508, iii) the background response of the radiation detector measured in step 502, iv) the radiation detector response to the background plus the LED output measured in step 508 (this will match within a predetermined tight tolerance the detector response to the background plus the radiation reference measured in step 504), v) the response due to the LED output (i.e., (the radiation detector response to the background radiation plus the LED output) minus (the radiation detector response to the background radiation)), and/or vi) the known dose rate of the radiation reference that was used in step 504.

Steps 504-510 may be repeated for additional radiation references. For example, the LED may be driven to levels to match multiple radiation references.

The above process may be repeated at alternate temperature points as desired or needed. For an alternate temperature point, the thermoelectric cooling system may be configured to maintain an alternate temperature set point for the radiation detector and/or the non-radioactive calibration source. After the temperature is stabilized, steps 502-510 may be repeated (steps 504-510 may be repeated multiple times for additional radiation references) while maintaining the new temperature set point.

In a case where the detector system includes an array of multiple detector elements, each element may be individually calibrated.

Embodiments for verifying proper operation of the radiation detector are disclosed hereafter. Periodically during normal use, the detector's operation can be verified by comparing the response due to the integrated LED being driven at a particular level to the corresponding response that was measured at the time of LED calibration. If the radiation detector's response due to the LED being driven differs from the previously established expected response by more than a pre-defined tolerance, the radiation detector will fail the verification and may not be relied upon until it is serviced or replaced. The verification is performed with the system in its regular (current) background radiation environment (with no extra radiation sources or exposure). The verification process may use the verification data determined and stored during the LED calibration.

Figure 6:
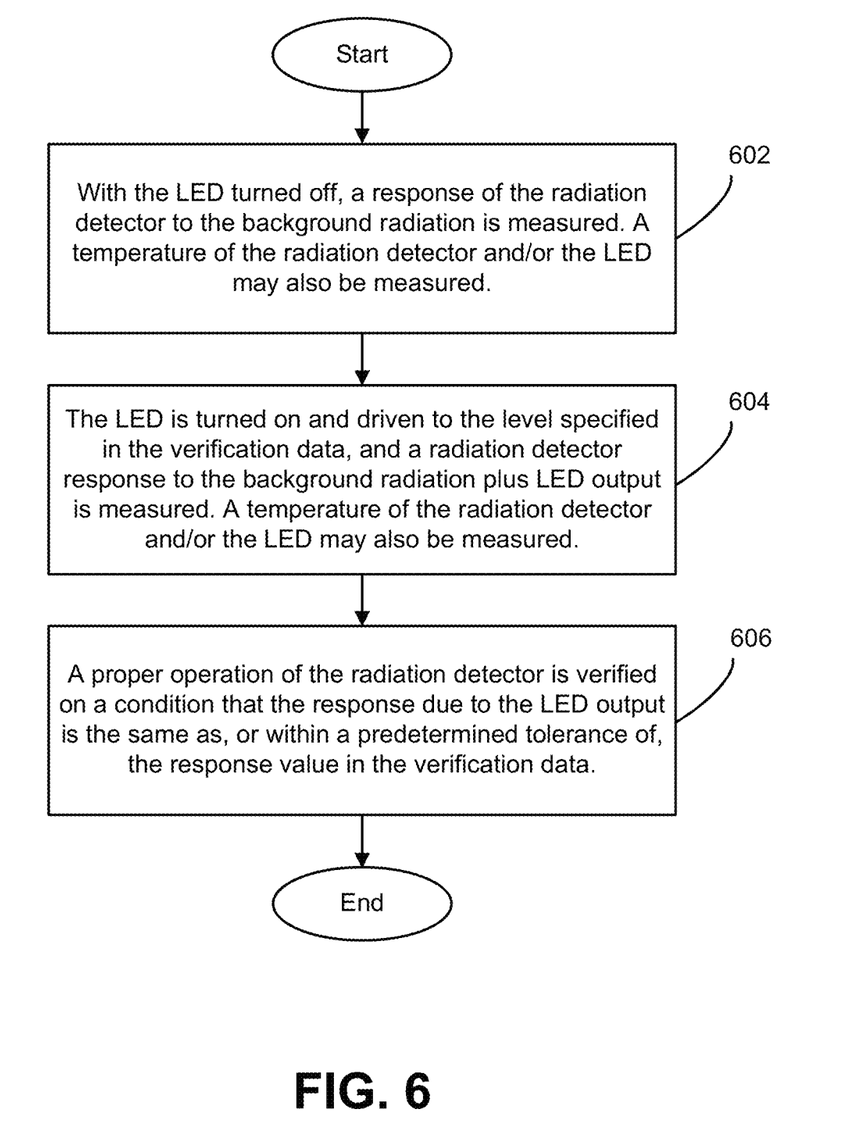
FIG. 6 is a flow diagram of an example of a process for verification of a radiation detector in accordance with an exemplary embodiment of the present disclosure.

FIG. 6 is a flow diagram of an example of a process for verification of a radiation detector in accordance with an exemplary embodiment of the present disclosure. In step 602, with the LED turned off, a response of the radiation detector to the background radiation and a temperature of the radiation detector and/or the LED may be measured.

In step 604, the LED may be turned on and driven to the level specified in the verification data, and a radiation detector response to the background radiation plus the LED output may be measured. A temperature of the radiation detector and/or the LED may also be measured. A radiation detector response due to the LED output may be calculated as: (the radiation detector response to the background radiation plus LED output) minus (the radiation detector response to the background radiation).

In step 606, a proper operation of the radiation detector may be verified on a condition that the response due to the LED output substantially matches the response value in the verification data. In one embodiment, the response due to the LED output substantially matches the response value in the verification data if the response due to the LED output is the same as, or within a predetermined tolerance of, the response value in the verification data. In one embodiment, the predetermined tolerance may be 1% of the response value in the verification data. In another embodiment, the predetermined tolerance may be 2.5% of the response value in the verification data. In another embodiment, the predetermined tolerance may be 5% of the response value in the verification data. In another embodiment, the predetermined tolerance may be 10% of the response value in the verification data.

If the response due to the LED output does not substantially match the response value in the verification data, the radiation detector is not operating as expected, and it should not be relied upon until it is serviced or replaced. One of the possible causes for verification failure is that the detector circuit offsets have drifted over time. Service including recalibration of the detector may resolve such a problem.

The tolerance may depend on the particular accuracy requirements of the given application. It may be a fixed value (e.g., a fixed absolute difference from the expected response) or a relative value (e.g., a percentage difference from the expected response). The tolerance may vary based on the actual measured temperature. For example, if the radiation detector's expected or required accuracy is different between moderate operating temperatures and extreme temperatures, the tolerance may be configured differently.

In cases where multiple radiation references are used during the LED calibration, the verification of the radiation detector may be performed using the verification data corresponding to the radiation reference dose rate of interest (e.g., an expected dose rate or threshold (alarm) level). The verification may be performed using the verification data corresponding to the radiation reference dose rate closest to the dose rate of interest.

In cases where the LED calibration is performed at one or more alternate temperature points, the verification may be performed with the verification data corresponding to the temperature point nearest to the current measured temperature.

In cases where the detector system includes an array of multiple detector elements, each optimized for a specific range of radiation dose rates, a high background radiation level could saturate the lower-dose detector elements. Verification may not be attempted while a detector is saturated. Instead, the higher-level detector element(s) not saturated may be verified. In such an array system including a single LED situated along with the array of detector elements, LED calibration and detector verification may be performed on one detector element at a time, each using the normal calibration and verification processes and using radiation reference levels appropriate to the range of radiation dose rates the detector element is optimized for.

It should be noted that although the embodiments are explained using an LED and a solid-state detector, the embodiments may be applied to other detector types and other radiation source types as well.

The claims are not limited to the specific implementations described above. Various modifications, changes and variations may be made in the arrangement, operation and details of the implementations described herein without departing from the scope of the claims.

What is claimed is:

1. A method for calibrating a drive level of a non-radioactive calibration source, comprising:
   measuring a response of a radiation detector to background radiation, wherein the background radiation has a known, stable level, the known, stable level of background radiation being known through a field measurement or relative check;
   measuring a response of the radiation detector to the background radiation plus a radiation reference, wherein the radiation reference is a radiation source with known properties located at a specific distance from the radiation detector to provide a known reference dose rate above the background radiation;
measuring a response of the radiation detector to the background radiation plus the non-radioactive calibration source; and
adjusting the drive level of the non-radioactive calibration source until the response of the radiation detector to the background radiation plus the non-radioactive calibration source substantially matches the response of the radiation detector to the background radiation plus the radiation reference.

2. The method of claim 1, wherein the non-radioactive calibration source comprises a light-emitting diode (LED).

3. The method of claim 1, wherein:
the radiation reference is not within range of the radiation detector and the non-radioactive calibration source is off when the response of the radiation detector to the background radiation is measured;
the non-radioactive calibration source is off when the response of the radiation detector to the background radiation plus the radiation reference is measured; and
the radiation reference is not within range of the radiation detector when the response of the radiation detector to the background radiation plus the non-radioactive calibration source is measured.

4. The method of claim 1, further comprising storing verification data comprising the drive level of the non-radioactive calibration source that caused the response of the radiation detector to the background radiation plus the non-radioactive calibration source to substantially match the response of the radiation detector to the background radiation plus the radiation reference.

5. The method of claim 4, wherein the verification data further comprises at least one of:
the response of the radiation detector to the background radiation;
the response of the radiation detector to the background radiation plus the non-radioactive calibration source;
a difference between the response of the radiation detector to the background radiation plus the non-radioactive calibration source and the response of the radiation detector to the background radiation;
a known dose rate of the radiation reference; and
a temperature of at least one of the radiation detector and the non-radioactive calibration source when the response of the radiation detector to the background radiation plus the non-radioactive calibration source is measured.

6. The method of claim 1, further comprising:
measuring at least one temperature corresponding to at least one of the radiation detector and the non-radioactive calibration source when the response of the radiation detector to the background radiation is measured;
measuring at least one temperature corresponding to at least one of the radiation detector and the non-radioactive calibration source when the response of the radiation detector to the background radiation plus the radiation reference is measured; and
measuring at least one temperature corresponding to at least one of the radiation detector and the non-radioactive calibration source when the response of the radiation detector to the background radiation plus the non-radioactive calibration source is measured.

7. The method of claim 6, further comprising restarting calibration if the at least one temperature that is measured when the response of the radiation detector to the background radiation plus the non-radioactive calibration source is measured does not substantially match:
the at least one temperature that is measured when the response of the radiation detector to the background radiation is measured; and
the at least one temperature that is measured when the response of the radiation detector to the background radiation plus the radiation reference is measured.

8. The method of claim 1, further comprising repeating the steps of measuring the response of the radiation detector to the background radiation plus the radiation reference, measuring the response of the radiator detector to the background radiation plus the non-radioactive calibration source, and adjusting the drive level of the non-radioactive calibration source for at least one additional radiation reference.

9. The method of claim 1, further comprising:
configuring a thermoelectric cooling system to maintain a new temperature for at least one of the radiation detector and the non-radioactive calibration source; and
repeating the steps of measuring the response of the radiation detector to the background radiation, measuring the response of the radiation detector to the background radiation plus the radiation reference, measuring the response of the radiation detector to the background radiation plus the non-radioactive calibration source, and adjusting the drive level of the non-radioactive calibration source while maintaining the new temperature.

10. A method for verifying calibration of a radiation detector, comprising:
measuring a response of the radiation detector to background radiation;
driving a non-radioactive calibration source to a drive level that is specified in verification data, the verification data being determined during calibration of the non-radioactive calibration source, wherein calibration of the non-radioactive calibration source comprises adjusting a calibration drive level of the non-radioactive calibration source until a response of the radiation detector to a calibration background radiation plus the non-radioactive calibration source substantially matches a response of the radiation detector to the calibration background radiation plus a radiation reference, wherein the calibration background radiation has a known, stable level, the known, stable level of background radiation being known through a field measurement or relative check, and wherein the radiation reference is a radiation source with known properties located at a specific distance from the radiation detector to provide a known reference dose rate above the calibration background radiation;
measuring a response of the radiation detector to the background radiation plus the non-radioactive calibration source; and
determining whether the radiation detector is calibrated based on the verification data and the response of the radiation detector to the background radiation plus the non-radioactive calibration source.

11. The method of claim 10, further comprising determining that the radiation detector is calibrated if a difference between the response of the radiation detector to the background radiation plus the non-radioactive calibration source and the response of the radiation detector to the background radiation substantially matches a corresponding value in the verification data.

12. The method of claim 10, further comprising determining that the radiation detector is not calibrated if a difference between the response of the radiation detector to the background radiation plus the non-radioactive calibration source and the response of the radiation detector to the background radiation does not substantially match a corresponding value in the verification data.

13. The method of claim 10, wherein:
the non-radioactive calibration source is off when the response of the radiation detector to the background radiation is measured; and
the method is performed without any radiation sources other than the background radiation within range of the radiation detector.

14. The method of claim 10, further comprising:
measuring at least one temperature corresponding to at least one of the radiation detector and the non-radioactive calibration source when the response of the radiation detector to the background radiation is measured; and
measuring at least one temperature corresponding to at least one of the radiation detector and the non-radioactive calibration source when the response of the radiation detector to the background radiation plus the non-radioactive calibration source is measured.

15. The method of claim 10, wherein the verification data comprises data corresponding to a plurality of different radiation references, and further comprising:
identifying a subset of the verification data corresponding to a radiation reference dose rate that is closest to a dose rate of interest; and
using the subset of the verification data to determine whether the radiation detector is operating correctly.

16. The method of claim 10, wherein the verification data comprises data corresponding to a plurality of different temperature points, and further comprising:
identifying a subset of the verification data corresponding to a temperature point that is closest to a current measured temperature; and
using the subset of the verification data to determine whether the radiation detector is operating correctly.

17. A radiation detection system, comprising:
a radiation detector;
a non-radioactive calibration source, wherein the radiation detector and the non-radioactive calibration source are positioned such that photons emitted from the non-radioactive calibration source are detected by the radiation detector;
memory for storing verification data, wherein verification data comprises a drive level of the non-radioactive calibration source determined by adjusting the drive level of the non-radioactive calibration source until a response of the radiation detector to a background radiation plus the non-radioactive calibration source substantially matches a response of the radiation detector to the background radiation plus a radiation reference, wherein the background radiation has a known, stable level, the known, stable level of background radiation being known through a field measurement or relative check, and wherein the radiation reference is a radiation source with known properties located at a specific distance from the radiation detector to provide a known reference dose rate above the background radiation; and
a light shield that shields the radiation detector from outside light sources.

18. The radiation detection system of claim 17, further comprising a thermoelectric cooling system that controls a temperature of the radiation detector.

19. The radiation detection system of claim 17, further comprising a thermoelectric cooling system that controls a temperature of the non-radioactive calibration source.

20. The radiation detection system of claim 17, further comprising a printed circuit board (PCB), wherein:
the radiation detector and the non-radioactive calibration source are mounted to the PCB; and
the light shield is attached to the PCB such that the light shield covers the radiation detector and the non-radioactive calibration source, and a light-tight seal exists between the light shield and the PCB.

* * * * *